Dec. 18, 1956 H. W. PATTON 2,774,932
SYNCHRONOUS RECTIFIER AND PHASE DETECTOR
Filed Dec. 8, 1954
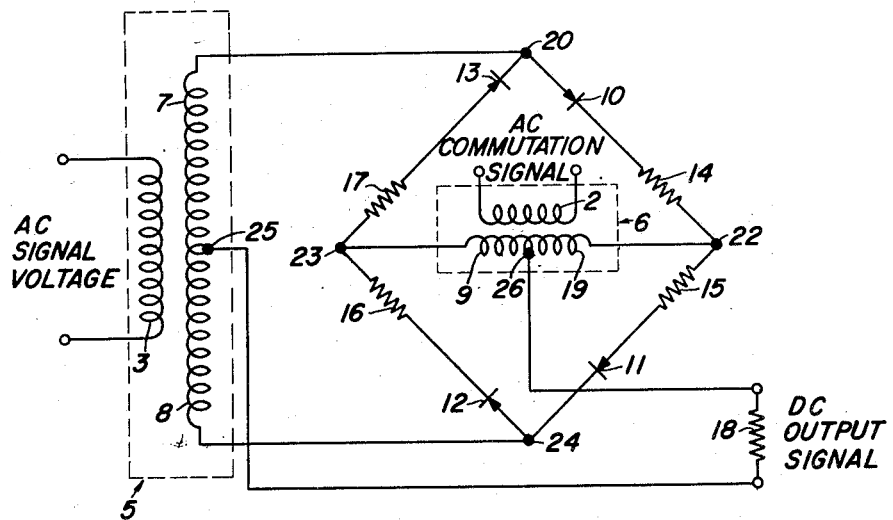
INVENTOR.
HENRY W. PATTON
BY
ATTORNEY

United States Patent Office 2,774,932
Patented Dec. 18, 1956

2,774,932

SYNCHRONOUS RECTIFIER AND PHASE DETECTOR

Henry W. Patton, Cedar Rapids, Iowa, assignor to Collins Radio Company, Cedar Rapids, Iowa, a corporation of Iowa Application December 8, 1954, Serial No. 473,994

4 Claims. (Cl. 321—47)

This invention relates to synchronous rectifier and phase detector circuits and more particularly to such circuits utilizing magnetic devices.

Many times it is necessary to change an alternating current signal to a direct current signal and have the phase of the alternating current signal control the polarity of the direct current signal. This requirement is particularly desirable in the expanding magnetic amplifier field. It is important, also, that this alternating current signal be changed to a direct current signal with a minimum power loss of the input signal. It has been a difficulty with prior phase detector and rectifier circuits that signal limiting has occurred. Signal limiting is the inability of a circuit to handle a sufficiently large input signal to provide an adequate output signal. It is also desirable that this rectifier and detector circuit be capable of altering impedance levels. This is particularly true to the extent necessary to prevent signal limiting.

This invention provides a phase detector and synchronous rectifier circuit which requires relatively small input voltages to obtain the necessary output voltages. This invention does not unduly limit the magnitude of the input signal and permits optimum conversion.

It is an object of this invention to provide a phase detector and synchronous rectifier circuit which is capable of large signal and output voltages. It is a further object of this invention to provide a phase detector and synchronous rectifier circuit which has a very low noise level and drift ratio.

It is a still further object of this invention to provide this phase detector and rectifier circuit with a minimum of circuit elements and consequently in the most economical manner. This and other objects of this invention will become apparent when the following description is read in conjunction with the accompanying drawing, in which the single figure consists of a schematic representation of the electrical circuit of this invention.

The operation of this synchronous rectifier and phase detector is in response to two alternating current voltage signals, the first being the alternating current commutation signal voltage which is impressed upon the primary winding 2 of the signal transformer 6 and the second being the alternating current signal voltage which is applied to the primary winding 3 of transformer 5. These transformers 5 and 6 have secondary windings 7 and 8, and 9 and 19, respectively. These secondary windings have center tap connections 25 and 26. The secondary windings are each connected to opposite junctions of the ring or bridge of diodes and resistors. These diodes or unilateral conductors and the resistances are connected in a continuous ring or bridge. That is to say that the forward or conducting direction of the unilateral connections is continuous around the bridge. The unilateral conductors are 10, 11, 12, and 13, and the resistances are 14, 15, 16, and 17. The alternating current signal voltage is impressed upon the primary winding 3 of transformer 5 and this signal must be in phase or 180 degrees out of phase with the alternating current commutation signal impressed upon the primary winding 2 of transformer 6 if a maximum output signal is to be produced. This phase relationship is necessary in order to obtain an output signal and therefore this circuit acts as a phase detector since only with these phase relationships is a maximum output obtained. The output is obtained when this phase relationship exists in the following manner: with the two signal voltages impressed as described above, a potential difference exists between points 20 and 25. Thus, with the proper voltages applied to the unilateral conductors 10 and 13, a current will flow through the two upper legs of the bridge which are then the conducting legs. At this time, the unilateral conductors 11 and 12 in the lower legs of the bridge are blocked by the commutation voltage applied at points 23 and 22. The value of the commutation voltage is greater than the value of the signal voltage. The current which flows as a result of the potential difference between points 20 and 25 flows through the two conducting legs of the bridge to combine at point 26 and to flow through output resistance 18 back to point 25. The flow of current through the output resistance 18 produces a voltage drop across the resistance which is the direct current output signal. The circuit thus acts as a synchronous rectifier.

Now on the next half cycle, the diodes 13 and 10 are blocked by the commutation voltage applied to points 22 and 23 and the signal voltage which appears between points 24 and 25 causes a current to flow in the lower or conducting legs of the bridge. The current which now splits between the two legs combines once more at point 26 and flows through the output resistance 18 back to point 25. Thus, on each half cycle of the alternating current signal voltage, a current flows in one half of the bridge and this current flows through the output resistance which generates the direct current output signal. This analysis of the operation of this circuit may be done in terms of voltages also, but it is believed that the current analysis provides a more complete description of the operation.

Any non-linearity in the conducting diodes has been effectively swamped; therefore, this circuit produces a lower drift and a lower noise output than prior circuits. Approximately ten times as large an input signal voltage may be handled by this circuit as was priorly possible with phase detectors and synchronous rectifier circuits of this nature.

Although this invention has been described with respect to a particular embodiment thereof, it is not to be so limited as changes and modifications may be made therein which are within the full intended scope of the invention as defined by the appended claims.

What I claim is:

1. A phase detector and synchronous rectifier comprising a plurality of transformers each having an alternating current voltage applied thereto, a plurality of unilateral current conducting means, a plurality of resistive elements, said resistive elements and said unilateral means connected together in a conductive series, said transformers individually connected to the junctions of pairs of said unilateral current conducting means and to the junctions of pairs of said resistive elements of said series, an output signal indicating means, and said transformers having their midpoints connected to said output indicating means whereby an output signal is produced responsive to the phase difference between said voltages applied to said transformers.

2. A phase detector and synchronous rectifier comprising a plurality of transformers, the primary side of each transformer individually connected to an alternating current voltage signal, a plurality of unilateral current conducting devices, a plurality of resistance elements, said resistance elements and said unilateral devices connected in a series with the unilateral devices being conductively related, said transformers individually connected to the junctions of pairs of said unilateral current conducting means and to the junctions of pairs of said resistance of said series, an output signal indicating means, and said transformers having their midpoints connected to said output indicating means whereby an output is indicated responsive to the phase difference between the voltages applied to said transformers.

3. A phase detector and synchronous rectifier comprising a plurality of transformers each having an alternating current voltage individually connected to the primary winding of said transformer, each of said transformers having individually center-tapped secondary windings, a plurality of unilateral current conducting devices, a plurality of resistance elements, said resistance elements and said unilateral devices connected together in series pairs and said pairs connected together in conductive series, and the secondary windings of said transformers individually connected to the connection points between said pairs, said center taps of said secondaries connected to an output generating device whereby an output signal is produced responsive to the phase difference between the alternating current voltages applied to said primaries of said transformers.

4. A phase detector and synchronous rectifier comprising a plurality of transformers, a plurality of unilateral current conducting devices, a plurality of resistive elements, said resistive elements and said unilateral devices connected together in pairs in a serially conductive loop, said transformers individually connected to said loop between junctions of pairs of said unilateral current conducting devices and the junctions between pairs of resistive elements, an output signal generating device, and said transformers having their midpoints individually connected to said generating device whereby a direct current output signal is generated, said last-mentioned device controlled by said conductive loop to produce a signal responsive to the phase difference between the voltages applied to said transformers.

References Cited in the file of this patent

UNITED STATES PATENTS

| | | |
|---|---|---|
| 2,148,718 | Agins | Feb. 28, 1939 |
| 2,454,807 | Kennedy | Nov. 30, 1948 |
| 2,696,582 | Willard | Dec. 7, 1954 |